United States Patent [19]
Schmidt et al.

[11] Patent Number: 5,407,629
[45] Date of Patent: Apr. 18, 1995

[54] MULTILAYER BOTTLE WITH SEPARABLE INNER LAYER AND METHOD OF FORMING SAME

[75] Inventors: Steven L. Schmidt; Wayne N. Collette, both of Merrimack; Suppayan M. Krishnakumar, Nashua, all of N.H.

[73] Assignee: Continental PET Technologies, Inc., Florence, Ky.

[21] Appl. No.: 102,490

[22] Filed: Aug. 5, 1993

Related U.S. Application Data

[60] Division of Ser. No. 814,923, Jan. 8, 1992, Pat. No. 5,301,838, which is a continuation-in-part of Ser. No. 644,624, Jan. 23, 1991, abandoned, and Ser. No. 698,931, May 13, 1991, abandoned.

[51] Int. Cl.⁶ ........................ B29C 49/22; B29C 49/26
[52] U.S. Cl. ..................... 264/512; 264/513; 264/155; 264/156
[58] Field of Search ........ 264/512, 513, 515, 154–156, 264/241, 255, 342 R

[56] References Cited

U.S. PATENT DOCUMENTS

| | | | |
|---|---|---|---|
| 798,093 | 8/1905 | Dean | 222/95 |
| 1,632,559 | 6/1927 | Pedrick | 222/386.5 |
| 2,571,424 | 10/1951 | Dailey | 222/95 |
| 3,896,602 | 7/1975 | Petterson | 53/36 |
| 4,182,457 | 1/1980 | Yamada et al. | 215/1 C |
| 4,254,075 | 3/1981 | Menzel et al. | |
| 4,457,455 | 7/1984 | Meshberg | 222/105 |
| 4,719,069 | 1/1988 | Reymann et al. | 264/512 |
| 4,816,093 | 3/1989 | Robbins, III | 264/515 |
| 4,892,230 | 1/1990 | Lynn, Jr. | 222/105 |
| 4,954,376 | 9/1990 | Krishnakumar et al. | |
| 4,980,100 | 12/1990 | Krishnakumar et al. | |
| 4,984,713 | 1/1991 | Chambers et al. | 222/105 |
| 5,012,956 | 5/1991 | Stoody | 222/95 |
| 5,020,691 | 6/1991 | Nye | 222/105 |
| 5,035,931 | 7/1991 | Yamoda et al. | |
| 5,078,948 | 1/1992 | Troutman et al. | |
| 5,242,085 | 9/1993 | Richter et al. | 222/105 |
| 5,242,086 | 9/1993 | Richter et al. | 222/105 |

FOREIGN PATENT DOCUMENTS

| | | |
|---|---|---|
| 0182094 | 5/1986 | European Pat. Off. |
| 1329257 | 9/1973 | United Kingdom ........ 264/513 |
| 1455453 | 11/1976 | United Kingdom |
| WO92/11187 | 7/1992 | WIPO |
| PCTUS9200-094 | 10/1992 | WIPO |
| PCTUS9200-094 | 11/1992 | WIPO |

*Primary Examiner*—Catherine Timm
*Attorney, Agent, or Firm*—Wolf, Greenfield & Sacks

[57] ABSTRACT

A multilayer plastic container for use with either a positive or negative pressure dispensing system, the container having an integral body with an inner layer which readily separates from an outer layer and collapses to dispense a product from the container. The container is formed by blow-molding a multilayer preform, and a bottom aperture is formed in the container for injecting air to separate the inner layer from the outer layer. Preferably, the inner layer is predelaminated during manufacture to facilitate its later separation during use. In the case of vacuum dispensing, air inlet vent holes are preferably formed at the points of maximum deformation to prevent collapse of the outer layer.

16 Claims, 7 Drawing Sheets

MULTILAYER BOTTLE WITH SEPARABLE INNER LAYER AND METHOD OF FORMING SAME

This application is a division of application Ser. No. 07/814,923, filed Jan. 8, 1992, now U.S. Pat. No. 5,301,838, which is a continuation-in-part of U.S. Ser. Nos. 07/644,624 filed Jan. 23, 1991 by Schmidt et al., now abandoned, and 07/698,931 filed May 13, 1991 by Schmidt, now abandoned.

This invention relates in general to new and useful improvements in dispensing containers, and more specifically to a multi-layer plastic container having an inner layer which is readily separable from an outer layer for independent collapse under positive or negative pressure to dispense a product packaged within the container.

BACKGROUND OF THE INVENTION

The known liquid dispensing systems for beverages and concentrated beverage syrups include a pressurized stainless steel dispenser and a more recently developed "bag in a box." The stainless steel dispenser has the advantage of being reusable, however, it is very expensive to manufacture and somewhat heavy and difficult to handle. The "bag in a box," consisting of a separately formed plastic liner in a corrugated paper box, is lighter in weight and less expensive to manufacture, but it is not reusable or recyclable and is susceptible to leakage if dropped. Although it has been suggested to provide a plastic container with a separately formed liner which is inserted in the container, this container has proven to be both too difficult and expensive to manufacture and as such is not commercially feasible. Thus, there exists the need for a dispensing system which will overcome the aforementioned problems.

SUMMARY OF THE INVENTION

In accordance with this invention, a multi-layer container for a dispensing system is provided having an inner layer which readily separates from an outer layer when positive or negative pressure is applied, in order to dispense a product from the container. The "inner layer" and "outer layer" may each be a single layer, or a plurality of layers. The container is economical to manufacture, light in weight, easy to handle, can be made of recyclable materials, and is "product efficient" in that substantially all of the product can be dispensed from the container during use.

The multi-layer container is blow molded from a multi-layer polymeric preform having at least two layers, wherein the inner layer is made of a material having substantially no tendency to form primary chemical bonds with the outer layer. The polymer of the inner layer is thus not substantially melt soluble in the polymer of the outer layer. The only bonding which exists between the non-soluble polymer layers is secondary hydrogen (i.e., non-chemical) bonding. As such, the disimilar layers may be separated through the application of force.

For pressure dispensing applications, a positive pressure of 20 psi is sufficient to initiate and propogate delamination of the inner layer as required to dispense a product.

In a vacuum dispensing application, the negative pressure levels generated are generally insufficient to delaminate the internal layers. As such, it is necessary to predelaminate the inner layer via pressure, followed by reinflation and product filling prior to vacuum dispensing.

In a preferred three-layer container, a thin boundary layer of a non-melt soluble second polymer is provided between innermost and outermost layers of a first polymer. Either the innermost layer alone, or the innermost and boundary layers together, may collapse to dispense the product. In a preferred five-layer construction, a pair of boundary layers are provided between innermost, core and outermost layers. Preferably, only the innermost layer, or the innermost and adjacent inner boundary layers collapse to dispense the product, although it may be desirable in certain applications to collapse both the innermost, boundary and core layers. Various other combinations of layers are also contemplated.

In a first embodiment, an aperture is provided in the bottom of the container extending through the outer layer and terminating at least at the inner layer, so that a continuous inner layer is preserved. Thus, positive pressure may be applied externally through the bottom aperture against the inner layer for delaminating and collapsing the same. The bottom aperture may be formed in the preform or in the container.

In a second preferred embodiment, a "predelamination step" is provided during manufacture of the container wherein the inner layer is separated from and collapsed toward the open end of the container, and the inner layer is then reexpanded to its original position adjacent the outer layer. This facilitates later collapse of the inner layer via vacuum after the container has been filled with a product and is ready for use.

In yet another embodiment, vent holes are formed in the outer layer during the predelamination step, to form a container particularly adapted for vacuum dispensing. Thus, when a negative pressure is applied to the mouth of the container to dispense a product, the vent holes, located in the outer layer at the points of maximum deformation, prevent collapse of the outer layer along with the inner layer.

The container of this invention, consisting of a relatively rigid outer layer and a separable liner, is useful for dispensing liquid products, such as a beverage or concentrated beverage syrup, as well as liquid/solid mixtures or slurries. For use with relatively thick (viscous) materials, e.g., ketchup, ice cream, etc., a positive pressure dispensing apparatus is particularly preferred wherein positive pressure is applied through a bottom opening in the outer layer to delaminate and collapse the inner layer and dispense the product. For less viscous liquids, e.g., syrup concentrate or carbonated soft drinks, a container with vent holes is preferred for use in a high-flow-rate vacuum dispensing system. "Highflow" is defined as a product removal rate which exceeds the rate at which ambient air enters the region of the container between the external and collapsing internal layers via the bottom opening. Thus, whereas a high-flowrate vacuum applied at the mouth of the container may tend to cause the outer layer to collapse along with the inner layer, resulting in container distortion and standing instability, the vent holes prevent such collapse of the outer layer. The air inlet vent holes are located at the point(s) of maximum deformation and their number depends on the number of such equal potential points.

In a preferred method of manufacture, the container is prepared according to the following steps:

(1) injection mold a multilayer preform with an innermost layer of a first thermoplastic resin (e.g., polyethylene terephthalate) and a next innermost layer of a boundary material which is substantially non-melt soluble in the first resin (e.g., ethylene vinyl alcohol);

(2) form a hole in the bottom of the preform to a depth not to break through the innermost layer;

(3) reheat the preform and stretch blow mold a container.

If the preferred vacuum dispensing container is desired, additional steps (4)-(6) are provided:

(4) predelaminate at least the innermost layer by applying mechanical or fluid pressure through the bottom hole, whereby the next innermost boundary layer may or may not collapse with the innermost layer;

(5) form air inlet vent holes in the body of the container through the non-collapsed outer layer(s); and (6) reinflate the collapsed inner layer(s) and inspect for leaks.

It is further preferred to form the bottom hole in the preform during injection molding of the preform, by an injection nozzle gate pin. Alternatively, the bottom hole may be formed (after injection molding) by drilling or milling. As a still further alternative, the hole may be formed in the bottom of the blown container, as opposed to the preform.

These and other features of the invention will be more particularly described by the following detailed description and drawings of certain preferred embodiments.

DETAILED DESCRIPTION

Figure 1:
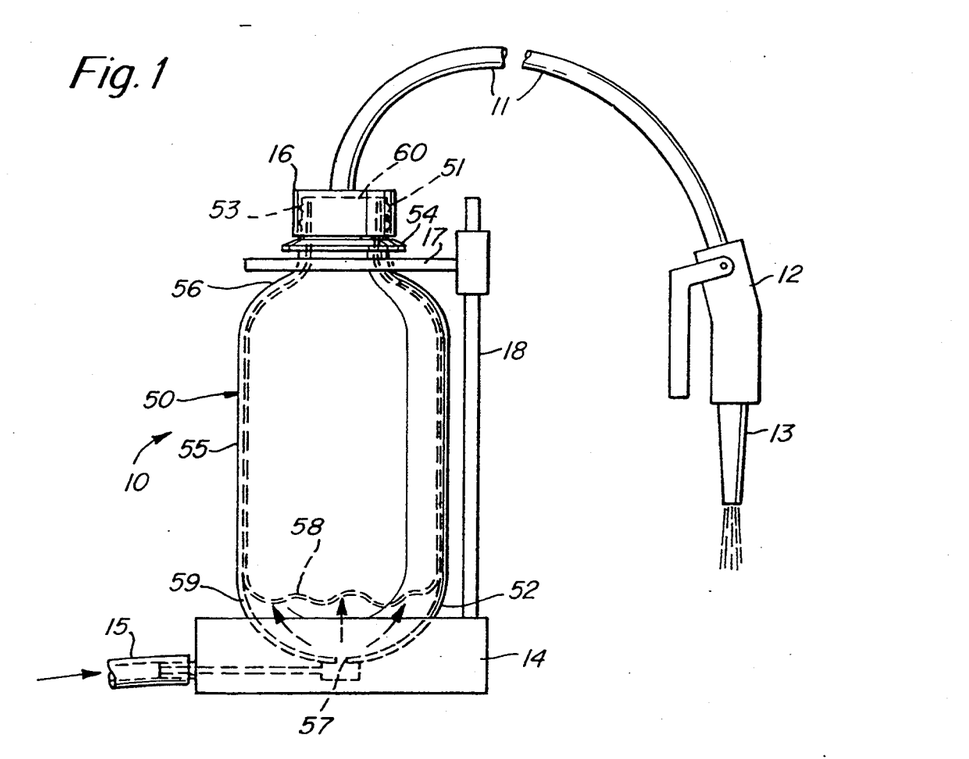
FIG. 1 is a schematic elevational view of a container of this invention being used in a pressure dispensing system, wherein an inner layer of the container is collapsed by positive pressure applied through a bottom aperture to squeeze the liquid out the mouth of the container through a dispensing hose.

Referring now to the drawings, FIG. 1 illustrates a positive-pressure liquid dispensing system 10 which utilizes a container 50 of this invention. The system includes a base 14 on which the container 50 is seated in sealed relation. The base 14 carries a standard 18 which is provided at the upper end thereof with an adjustable clamp member 17. The clamp member 17 engages a shoulder portion 56 of the container around and below a neck portion or thread finish 51, which includes external screw threads 53 and a neck flange 54. The thread finish 51 carries a cap 16 which is provided with a dispensing hose 11. The dispensing hose 11 terminates in a valved dispenser 12 which, when actuated, permits the product from within the container 50 to flow out through a nozzle 13 thereof. In typical usage, the product within the container 50 will be a liquid and the liquid will be dispensed into a glass or other container (not shown).

The base 14 carries an air line 15 through which air or other gas under pressure is directed into a bottom opening 57 in a base portion 52 of the container. The positive pressure air pushes a separable inner layer 58 of the container upwardly towards the mouth 60 of the container to dispense the product, while a substantially rigid outer layer 59 of the container remains substantially undeformed. The outer layer 59 remains relatively rigid due to the internal pressure for dispensing the product, but would be applied relatively flexible without such pressure.

Figure 2:
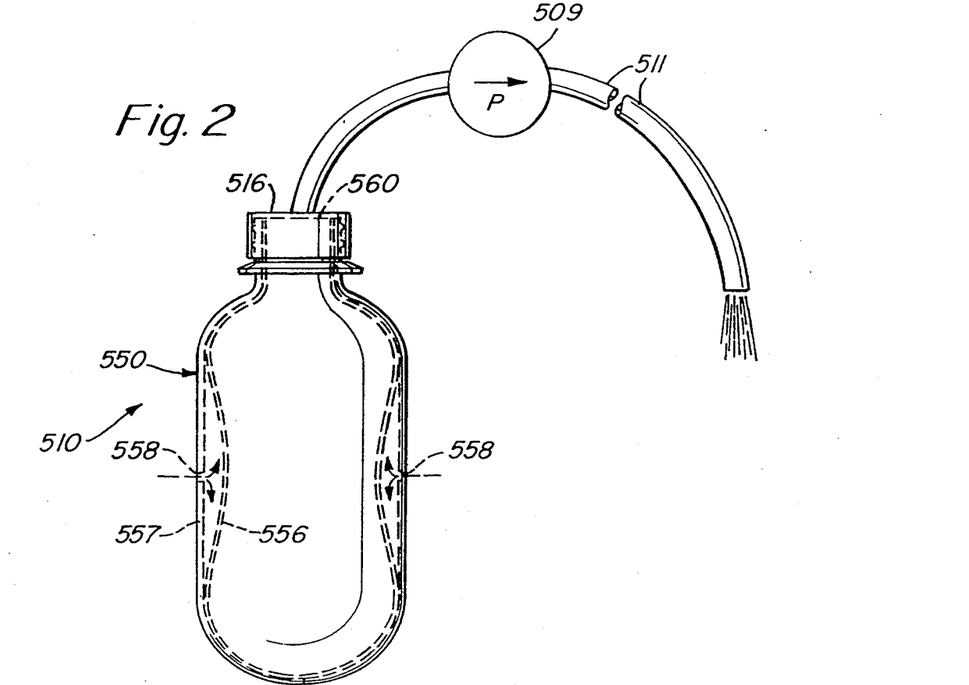
FIG. 2 is a schematic elevational view of an alternative embodiment of the container of this invention being used in a negative pressure (i.e., vacuum) dispensing system, wherein the inner layer is collapsed by the application of negative pressure at the mouth of the container and vent holes are provided in the outer layer to prevent collapse thereof.

FIG. 2 shows an alternative dispensing system 510 of this invention, wherein the product is dispensed under negative pressure (i.e., vacuum). In this system, a container 550 is provided which is substantially similar to the container 50 of the first embodiment, but which is "predelaminated" and includes a plurality of air inlet vent holes 558 in the rigid outer layer 557 at the points of maximum deformation, so that a vacuum applied to the mouth 560 of the container to dispense the product collapses the inner layer 556, but not the outer layer 557. As shown in FIG. 2, atmospheric air enters the vent holes 558 to fill the space between the inner layer 556 and the outer layer 557, to prevent collapse of the outer layer 557. A cap 516 is provided at the mouth 560 of the container, connected to a dispensing hose 511, to which a vacuum pump 509 is attached for drawing a vacuum at the mouth of the container.

Figure 3:
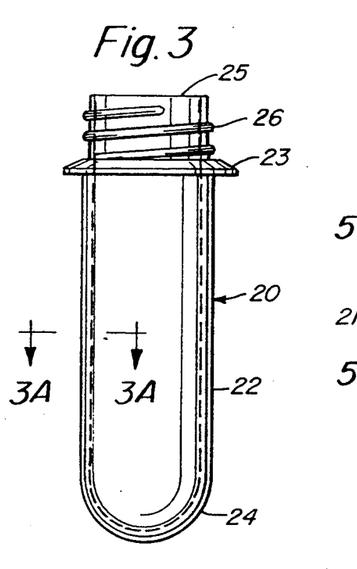
FIG. 3 is a side elevational view of a multilayer preform from which the container of this invention is formed.
Figure 3A:
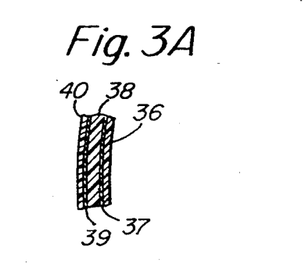
FIG. 3A is a sectional view across the preform wall taken along section lines 3A—3A.
Figure 4:
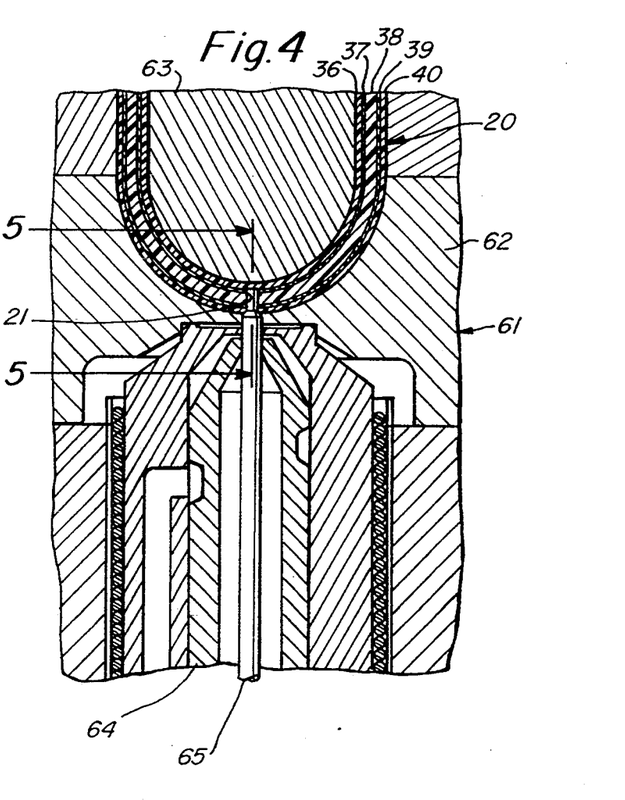
FIG. 4 is a schematic sectional view showing how the preform is formed in an injection mold and wherein the gate pin is provided with an extension for forming a bottom aperture through the outer layer of the preform.

FIG. 3 illustrates a multilayer preform 20 for forming a container in accordance with this invention. The preform 20 includes an elongated cylindrical body 22 having a generally hemispherical closed bottom end 24 and an open top end 25 with a thread finish 26 and neck flange 23. The preform 20 has multiple layers, which as shown in FIGS. 3–4, include an innermost layer 36, an inner boundary layer 37, a core layer 38, an outer boundary layer 39, and an outermost layer 40, in serial relation from the inner to the outer surfaces of the preform. In this preferred five-layer structure, the innermost and outermost layers 36 and 40 are of substantially equal thickness and are formed of the same thermoplastic material, preferably polyethylene terephthalate (PET). The central core layer 38 is substantially twice the thickness of the innermost and outermost layers and is also formed of PET. The inner and outer boundary layers 37 and 39 are substantially thinner and are made of a different material having little if any primary affinity for (i.e., tendency to chemically bond or adhere to) the adjacent layers 36, 38 and 40. A preferred boundary material is ethylene vinyl alcohol (EVOH). Other suitable materials include polyethylene, polypropylene, nylon (MXD-6), etc.

The preform may be injected molded substantially as described in U.S. Pat. No. 4,609,516 entitled Method of Forming Laminated Preforms, issued Sep. 2, 1986 on an application by Krishnakumar et al., which is hereby incorporated by reference in its entirety. The innermost layer 36 and outermost layer 40 are injected into an injection mold 61 (see FIG. 4) at the same time and are normally formed of the same material and have the same thickness. The molten polymer is injected through a nozzle 64 into a space between an outer mold member 62 and core 63. A separate material for forming the boundary layers 37 and 39 is next injected into the mold. Finally, the core layer 38 is injected into the mold, and preferably is of the same material as the layers 36 and 40, so as to complete the construction of the preform 20. Other core materials such as post-consumer (recycled) PET may be utilized as well.

Figure 5:
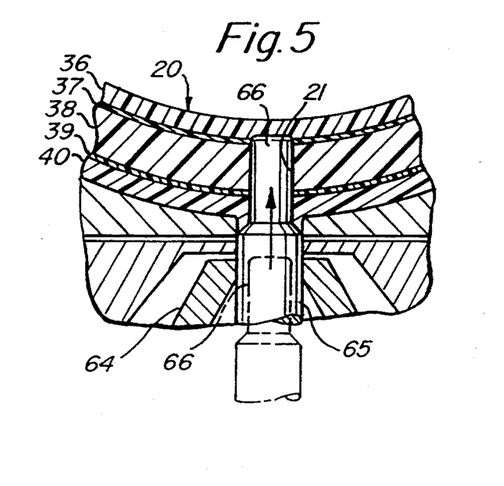
FIG. 5 is an enlarged fragmentary view taken along the section lines 5—5 of FIG. 4 showing more specifically the function of the extension of the gate pin to form the bottom aperture.

In a preferred embodiment, an aperture 21 is formed in the bottom of the preform during the injection molding process. As shown in FIGS. 4 and 5, this is preferably accomplished by providing the gate pin 65 of the injection nozzle 64 with an extension 66, wherein the aperture 21 may be automatically formed. At the time the gate pin 65 is moved to the nozzle closing position, the last injected plastic material which forms the core layer 38 is still molten with the result that the gate pin extension 66 will enter into the molten plastic material of the outer layers 40, 39, 38 and 37, terminating at least at the innermost layer 36, to form the opening 21.

Figure 6:
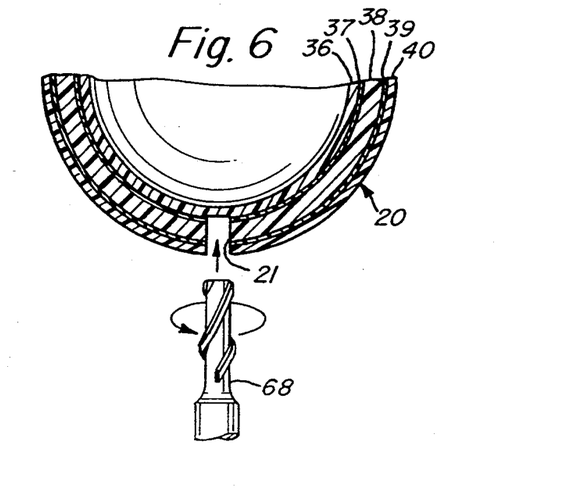
FIG. 6 is a fragmentary sectional view showing an alternative method of forming the bottom aperture, wherein the aperture is formed through the outer layer of the preform utilizing a drill or mill.

In an alternative embodiment shown in FIG. 6, the aperture 21 in the bottom outer layers of the preform 20 is formed after the injection molding process, by externally machining an opening through the outer layers 40, 39, 38 and 37 with a flat end drill or mill 68.

Figure 7:
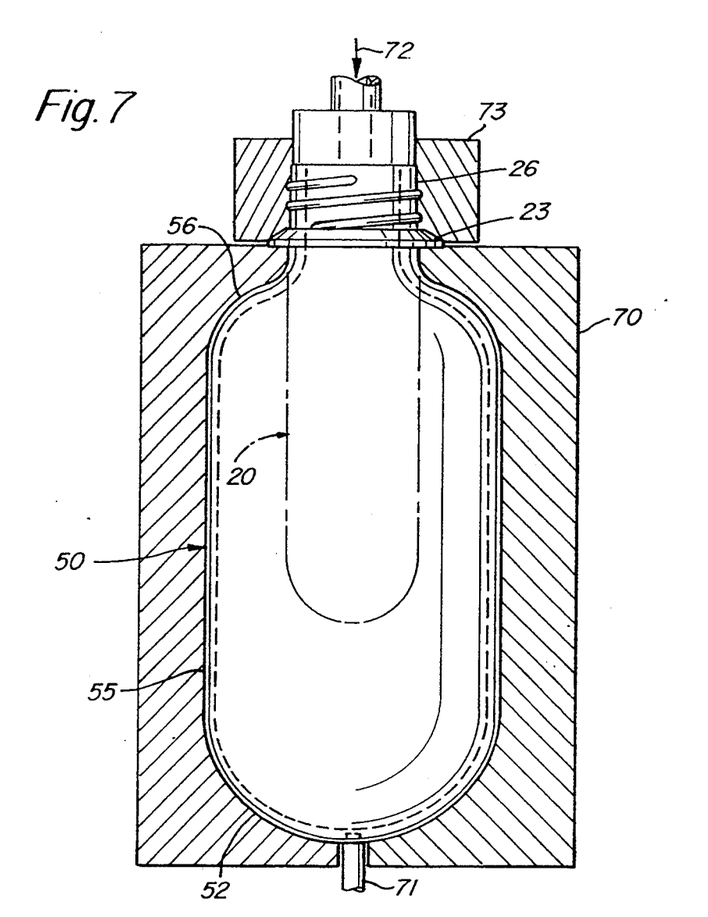
FIG. 7 is a vertical sectional view showing how the preform is expanded in a blow mold to form a container according to this invention.

The preform 20 is now ready for blow molding as shown in FIG. 7. The blow mold includes a lower mold body 70 whose inner surfaces define the expanded body of the container, while a retaining member 73 engages the thread finish 26 of the preform above the neck flange 23. A pressurized fluid such as air (shown by arrow 72) enters the open mouth 25 of the preform to expand the same and form the container 50.

Figure 8:
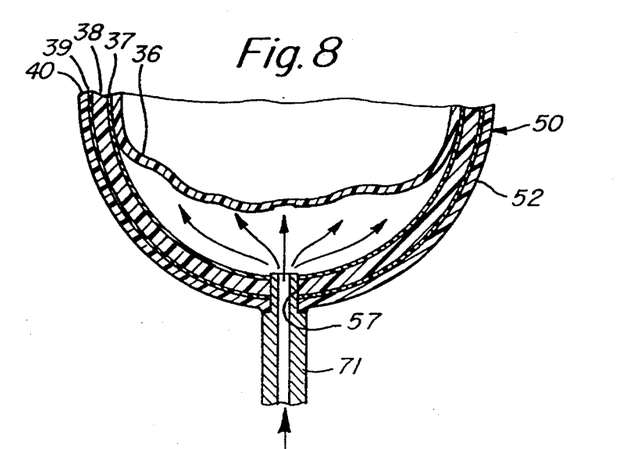
FIG. 8 is a fragmentary vertical sectional view of the bottom of the blown container showing how the inner layer is separated from the outer layer in a predelamination step.

The container body 50 is a unitary structure having a plurality of layers with a closed bottom end 52 and an open top end or mouth 60 (see FIGS. 1, 7 and 8). The expanded body includes a graduated shoulder portion 56, a cylindrical panel portion 55, and a hemispherical base 52, all of which have been expanded within the blow mold 70 from portions of the preform 20. The neck or thread finish 51 (which is in fact the thread finish 26 of the preform 20) includes exterior threads 53 and a neck flange 54. Other embodiments may include the freestanding containers of the champagne or footed Petalite type as shown in U.S. Pat. No. Des. 315,869, and U.S. Pat. Nos. 3,598,270, 4,785,949 and 5,066,528.

Figure 9:
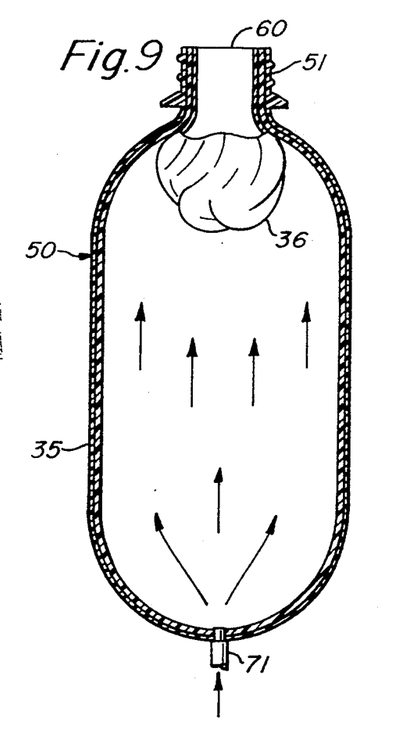
FIG. 9 is a vertical sectional view showing how the inner layer is collapsed toward the mouth of the bottle during the predelamination step.
Figure 10:
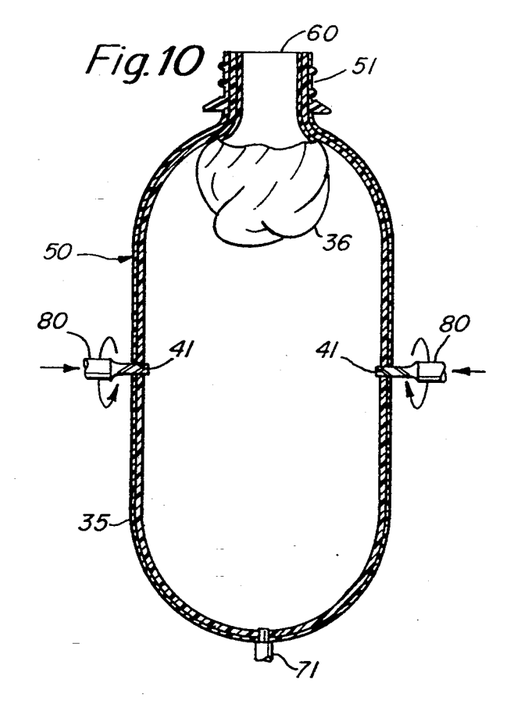
FIG. 10 is a vertical sectional view showing an additional step for forming the preferred vacuum dispensing container, wherein air inlet vent holes are formed in the outer layer while the inner layer is collapsed.

There is substantially no primary (chemical) bonding between the expanded layers of the container, i.e., between the innermost layer 36 of PET and the inner boundary layer 37 of EVOH. At most, secondary (hydrogen bonding) exists between these layers. As a result, when fluid under pressure is directed through a plug 71 into bottom opening 57, as shown in FIG. 8, the fluid will cause separation of innermost layer 36 from inner boundary layer 37 and collapse of the innermost layer 36 within the container. As shown in FIG. 9, innermost layer 36 collapses upwardly towards the open mouth 60 of the container, until reaching the substantially thick and rigid thread finish portion 51 or upper shoulder where there has been no substantial stretching of the plastic materials of the preform 20, and wherein the five layers 36–40 remain connected together. Thus, a substantially full collapsing of the innermost layer 36 is possible while the extreme upper part of the innermost layer 36 remains tightly joined to the outer layers 35.

Figure 11:
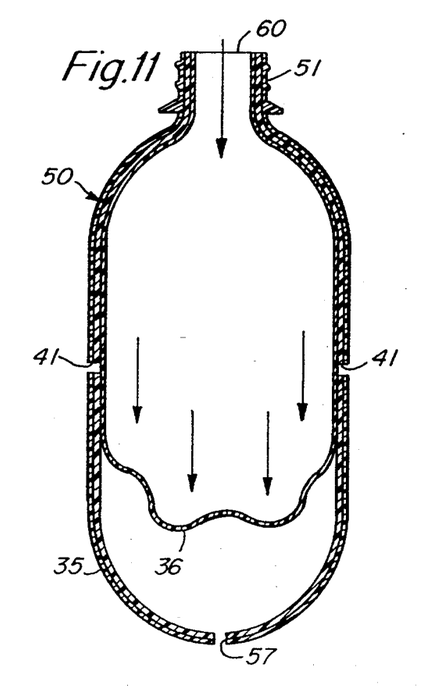
FIG. 11 is a vertical sectional view of the container of FIG. 10 showing how the inner layer is reexpanded by the application of positive pressure at the mouth of the bottle to return the inner layer to its original position adjacent the outer layer.

For pressure dispensing, the initial delamination and collapse of the inner layer may occur while the product is in use. However, for either pressure or vacuum dispensing where the pressure may not be sufficient to delaminate the layers, a predelamination step is performed. Thus, in the same manner as shown in FIG. 8, positive pressure is injected through the bottom aperture 57 to delaminate and collapse innermost layer 36. For a pressure dispensing system, the innermost layer 36 may then be simply returned to its starting position by applying pressure through the open mouth of the container (see FIG. 11); alternatively a vacuum may be drawn through the bottom aperture 57. However, if the container is to be used in a vacuum dispensing system with a high rate of flow which may cause deformation of the outer layer, a plurality of vent apertures 41 are formed during predelamination in the panel section of the outer layers 35, where maximum deformation would occur. The vent holes 41 are formed by a drill or flat end mill 80, or by touching with a hot point to melt the outer layers, while the innermost layer 36 remains collapsed just below the neck of the container. Then, as shown in FIG. 11, the innermost layer 36 is reinflated by injecting positive pressure air through the mouth 60 of the container, and the container is automatically pressure tested for leaks.

Figure 12:
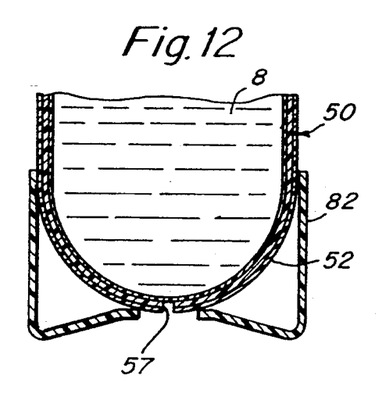
FIG. 12 is a fragmentary sectional view showing the bottom of a filled container held in a stabilizing base.

As shown in FIG. 12, the container 50 is then filled with a liquid product 8 and is ready for dispensing. If desired, for example with a hemispherical base portion 52, the container may further include a separate base cup 82 into which the base 52 of the body is inserted for stabilizing the container. For use in a pressure dispensing system, a pressurized air line would be connected to the bottom aperture 57 (see air line 15 in FIG. 1). In a vacuum dispensing system, aperture 57 may remain open.

The container may be made from a variety of materials, limited only by the requirement that the inner layer (which may include more than one layer) be readily separable from the next inner layer. Thus, the innermost, core and outermost layers 36, 38 and 40 may be made of any first thermoplastic resin, such as the polymers typically used in the packaging industry, i.e., polyethylene teraphthalate (PET), polypropylene, polyethylene, polyvinyl chloride, polycarbonate and mixtures thereof. The boundary layers 37 and 39 are made of a material which is not substantially melt soluble in and thus has substantially no tendency to chemically bond or adhere to the material of the other layers 36, 38 and 40. The boundary layers may be made of any second polymer resin such as ethylene vinyl alcohol (EVOH), polyethylene vinyl alcohol (PVOH), nylon (e.g., MXD-6 sold by Mitsubishi Corporation, New York, N.Y.), and mixtures thereof. A particularly preferred container has innermost, core and outermost layers of PET and thin boundary layers of EVOH.

It is further contemplated that more than one layer may be collapsed as the separable liner. Thus, in the five-layer structure previously described, the inner boundary layer 37 may collapse along with the innermost layer 36. Still further, the core layer 38, inner boundary layer 37 and innermost layer 36 may collapse as a unit. Still further, outer boundary layer 39, core layer 38, inner boundary layer 37 and innermost layer 36 may collapse as a unit. All that is required is that the remaining outer layer or layers be sufficiently rigid, and the collapsible layers sufficiently pliable, to permit ready separation between the inner and outer layers and noncollapse of the outer layers.

Figure 13:
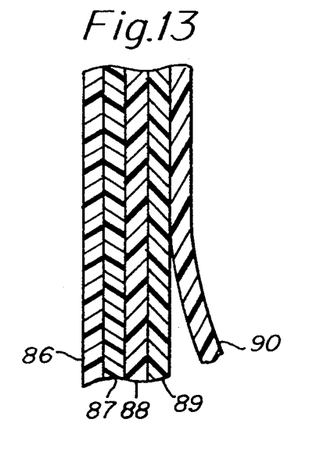
FIG. 13 is a fragmentary sectional view taken through the container wall of an alternative embodiment having five layers, wherein the two boundary layers are substantially as thick as the innermost, core and outermost layers.

As a still further embodiment, FIG. 13 shows a five-layer construction wherein all of the layers are of substantially equal thickness. The structure includes innermost layer 90, inner boundary layer 89, core layer 88, outer boundary layer 87, and outermost layer 86. In the illustrated case, innermost layer 90 separates from inner boundary layer 89 to form the collapsible liner.

Figure 14:
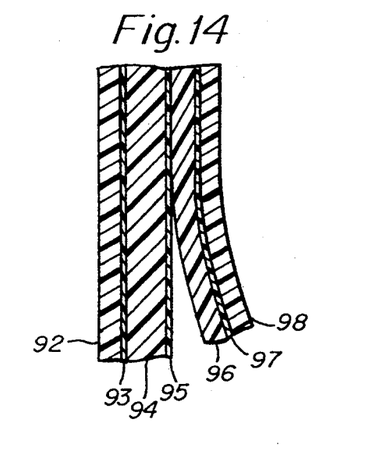
FIG. 14 is a fragmentary sectional view taken through the container wall of another alternative embodiment having a seven-layer construction, wherein three relatively thin boundary layers are provided and both the innermost and first core layers are separated from the outer layers.

In a further embodiment shown in FIG. 14, a seven-layer structure is provided wherein innermost layer 98, inner boundary layer 97 and first core layer 96 separate as a unit to form the collapsible liner, and the central boundary layer 95, second core layer 94, outer boundary layer 93, and outermost layer 92 form the rigid outer layers of the container which do not collapse. Numerous other alternatives are possible.

In the case of a container with air inlet vent holes for vacuum dispensing, the holes must be properly located to insure that the internal negative dispensing pressure will not pull the entire panel wall inwardly during vacuum dispensing. The location and number of vent holes depends on the deformation characteristics of the container when it is subjected to internal negative pressure. The deformation characteristics are a function of the container's shape, size, and wall thickness distribution. For proper functionality, the vent holes must be located at the point(s) of maximum deformation and their number depends on the number of such equal potential points. FIGS. 15–22 illustrate the proper placement of the vent holes for a number of different container configurations.

Figure 15:
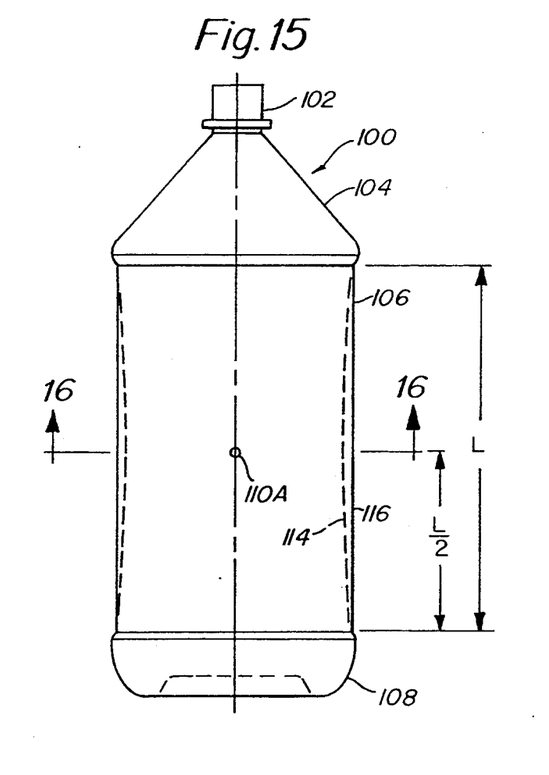
FIG. 15 is a schematic side elevational view showing the number and location of air inlet vent holes for a container having a circular cross section.
Figure 16:
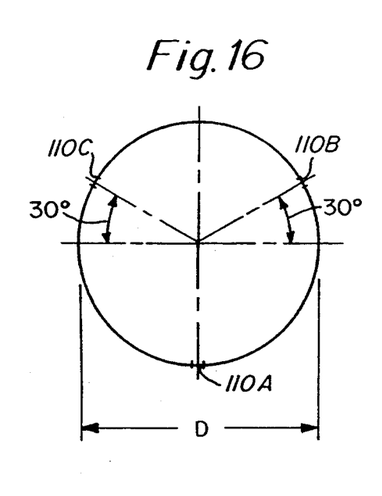
FIG. 16 is a schematic cross-sectional view taken along the section lines 16—16 of FIG. 15, showing three equally spaced vent holes.

FIG. 15 shows a schematic side elevational view and FIG. 16 a schematic cross-sectional view, of a container 100 having a circular panel cross-section. The container 100 includes a thread flange 102, shoulder section 104, panel section 106, and base 108. The panel section 106 is the area of maximum deformation under negative pressure. For a panel height L and a panel diameter D, where L/D>1, three vent holes 110A, B, C are required at equally spaced points around the circumference, i.e., 120° apart. An inner layer or liner 114 will then separate from an outer sidewall layer 116 as shown by dashed lines.

Figure 17:
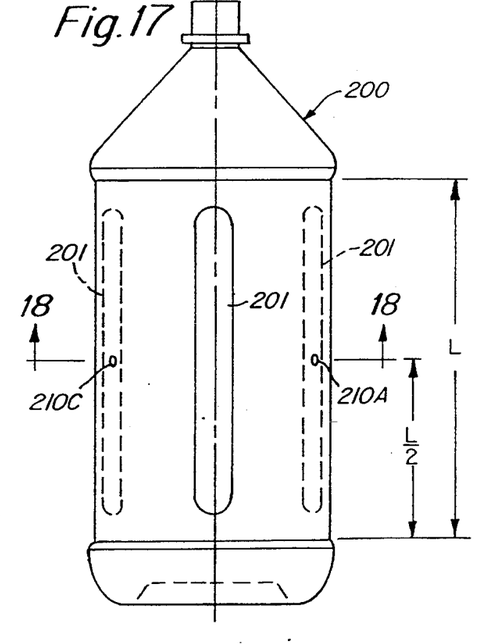
FIG. 17 is a schematic side elevational view showing the number and location of air inlet vent holes for a container having a circular cross-section with vertical panel ribs.
Figure 18:
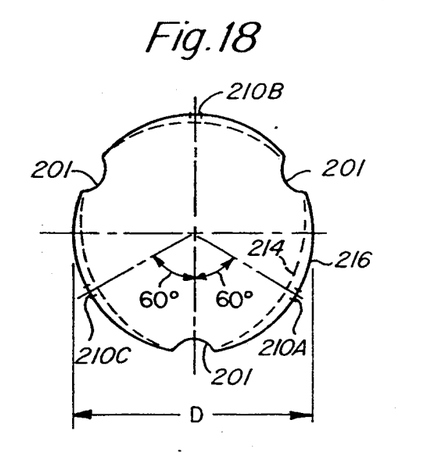
FIG. 18 is a schematic cross-sectional view taken along the section lines 18—18 of FIG. 17, showing three equally spaced vent holes.

As shown in FIGS. 17–18, a container 200 is provided similar to that shown in FIGS. 15–16, but having a circular cross-section with three vertical vacuum panel ribs 201. For a panel height L and a panel diameter D, where L/D>1, three vent holes 210A–C are required at the midpoints between the ribs 201 (again 120° apart). An inner layer 214 will then separate from an outer layer 216 as shown by dashed lines.

Figure 19:
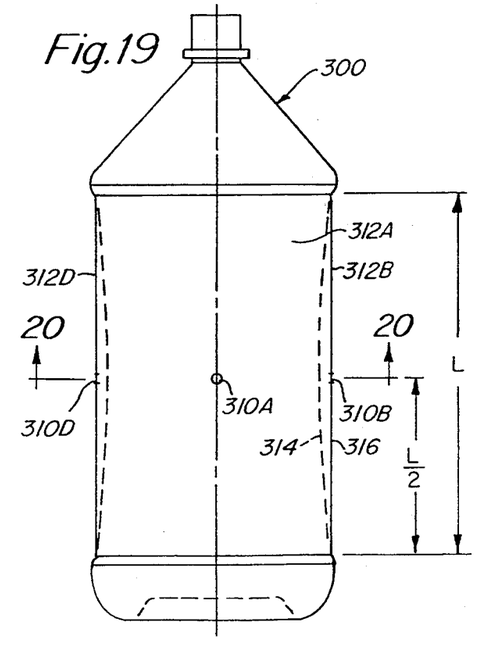
FIG. 19 is a schematic side elevational view showing the number and location of air inlet vent holes for a container having a square cross section.
Figure 20:
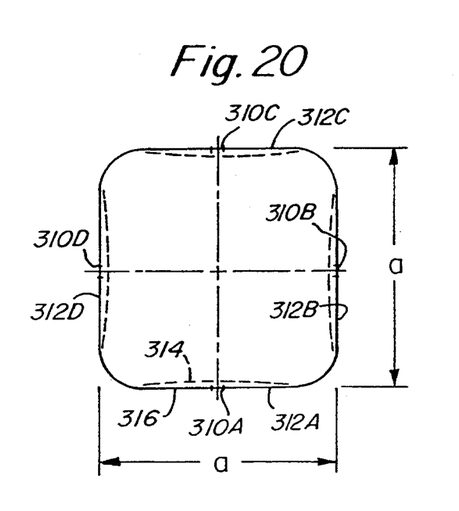
FIG. 20 is a schematic cross-sectional view taken along the section lines 20—20 of FIG. 19, showing four equally spaced vent holes.

As shown in FIGS. 19–20, a container 300 is provided similar to that shown in FIGS. 15–16, but having a square panel cross section. For the case of a vertical panel height L, and a vertical panel width a, where L/a>1, four vent holes 310A–D are placed at the horizontal and vertical centers of the panel sidewalls 312A–D. An inner layer 314 will then separate from an outer layer 316 as shown by dashed lines.

Figure 21:
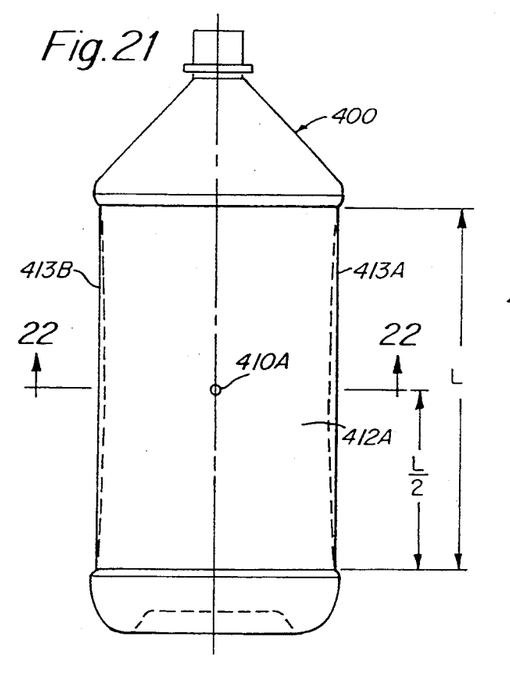
FIG. 21 is a schematic side elevational view showing the number and location of air inlet vent holes for a container having a rectangular cross section.
Figure 22:
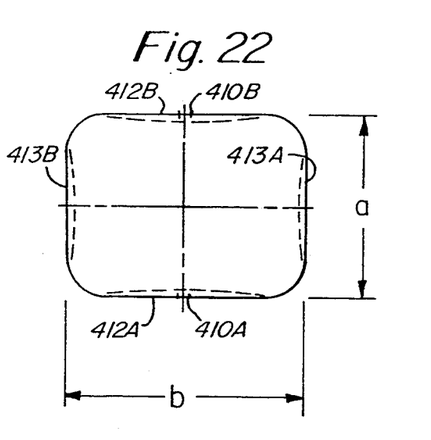
FIG. 22 is a schematic cross-sectional view taken along the section lines 22—22 of FIG. 21, showing four spaced vent holes.

As shown in FIGS. 21–22, a container 400 is provided similar to the container of FIGS. 15–16, but having a rectangular panel cross section. For a panel height L and panels widths a and b ("a" defining long sidewalls 412A and B, and "b" defining short sidewalls 413A and B), where L/b>1 and b>a, two vent holes 410A, B are required in the longer sidewalls 412A and 412B.

It is readily apparent that the minimum number of vent holes can thus be determined for a container of any given size or shape.

Although several preferred embodiments of the invention have been specifically illustrated and described herein, it is to be understood that variations may be made in the preform construction, materials, the container construction and the method of forming the container without departing from the spirit and scope of the invention as defined by the appended claims.

What is claimed is:

1. A method of forming a container, comprising the steps of:
   providing an integral plastic multilayer preform (20) having an open end (25), a closed end (24), inner and outer adjacent layers (36, 35), and an aperture (21) formed in the closed end (24) from the exterior of the preform and terminating at the inner layer (36);
   expanding the preform (20) to form a container having an integral body (50) with a closed end (52), an open end (60) and a plurality of adjacent layers (36, 35), wherein the preform layers following expansion form a continuous inner layer (36) readily separable from an outer layer (35) at the closed end (52) of the body and joined thereto at least at the open end (60);
   collapsing the inner layer (36) to separate the inner layer (36) from the outer layer (35) at the closed end (52) of the body; and
   returning the inner layer (36) to a position adjacent the outer layer (35).

2. The method of claim 1, wherein the collapsing step comprises:
   applying positive or negative pressure to the inner layer (36) of the container to separate the inner layer (36) from the outer layer (35).

3. The method of claim 1, further comprising:
   while the inner layer (36) is collapsed, forming vent apertures (41) in the outer layer (35) at the points of maximum deformation when negative pressure is applied internally to the container body.

4. The method of claim 1, wherein one of the inner and outer layers includes a first layer (36) of a first polymer and the other of the inner and outer layers includes a second layer (37) of a second polymer adjacent to the first layer, and wherein the second polymer is not substantially melt soluble in the first polymer.

5. The method of claim 1, wherein one of the inner and outer layers includes a first layer (36) of a first polymer and the other of the inner and outer layers includes a second layer (37) of a second polymer adjacent to the first layer, and wherein at the open end (60) of the container the first and second polymer layers are joined by hydrogen bonding.

6. The method of claim 1, wherein at least one of the inner and outer layers includes a boundary layer (37) having substantially no tendency to chemically bond or adhere to an adjacent layer (36).

7. The method of claim 4, wherein the first polymer is selected from the group consisting of polyester, polypropylene, polyethylene, polyvinyl chloride, polycarbonate, and copolymers and mixtures thereof.

8. The method of claim 7, wherein the second polymer is selected from the group consisting of ethylene vinyl alcohol, polyethylene vinyl alcohol, nylon, and copolymers and mixtures thereof.

9. The method of claim 7, wherein the first polymer is polyester.

10. The method of claim 9, wherein the polyester is substantially polyethylene terephthalate.

11. The method of claim 10, wherein the second polymer is substantially ethylene vinyl alcohol.

12. The method of claim 4, wherein the second layer comprises a relatively thin boundary layer (37) as compared to a relatively thick first layer (36).

13. The method of claim 1, wherein the container (50) formed is adapted to hold a viscous product such as ketchup and the inner layer (58) is collapsible by the application of positive pressure between the inner and outer layers (58, 59).

14. The method of claim 1, wherein the container (550) formed is adapted to hold a liquid product such as beverage concentrate and the inner layer (556) is collapsible by the application of negative pressure within the inner layer.

15. The method of claim 1, wherein the inner and outer layers (36, 35) form a continuous endwall at the open end (60) of the container.

16. The method of claim 4, wherein each of the inner and outer layers include first layers (36, 40) of the first polymer, and wherein the second layer (37) of the second polymer is adjacent to at least one of the first layers.

* * * * *